United States Patent
Eden et al.

(10) Patent No.: US 8,939,676 B2
(45) Date of Patent: Jan. 27, 2015

(54) AMMONIA STRIPPER

(75) Inventors: Robert Eden, Coventry (GB); Mark Moulden, Coventry (GB)

(73) Assignee: Process Limited, Coventry (GB)

( * ) Notice: Subject to any disclaimer, the term of this patent is extended or adjusted under 35 U.S.C. 154(b) by 0 days.

(21) Appl. No.: 13/985,446

(22) PCT Filed: Feb. 14, 2012

(86) PCT No.: PCT/GB2012/000151
§ 371 (c)(1),
(2), (4) Date: Dec. 26, 2013

(87) PCT Pub. No.: WO2012/110760
PCT Pub. Date: Aug. 23, 2012

(65) Prior Publication Data
US 2014/0216308 A1 Aug. 7, 2014

(30) Foreign Application Priority Data
Feb. 14, 2011 (GB) .................................. 1102538.4

(51) Int. Cl.
*C02F 1/20* (2006.01)
*B01D 19/00* (2006.01)
*F23G 7/06* (2006.01)
*C02F 1/74* (2006.01)
*C02F 101/16* (2006.01)

(52) U.S. Cl.
CPC ............. *C02F 1/20* (2013.01); *B01D 19/0005* (2013.01); *F23G 7/065* (2013.01); *C02F 1/74* (2013.01); *C02F 2101/16* (2013.01); *C02F 2209/02* (2013.01)

USPC ................... 405/52; 405/129.2; 405/129.95; 210/747.9; 210/170.08

(58) Field of Classification Search
USPC ................. 405/52, 129.2, 129.95; 210/747.9, 210/170.08
See application file for complete search history.

(56) References Cited

U.S. PATENT DOCUMENTS

| | | | |
|---|---|---|---|
| 3,428,426 A | 2/1969 | Carney et al. | |
| 4,689,156 A * | 8/1987 | Zibrida | 210/747.9 |
| 5,238,580 A * | 8/1993 | Singhvi | 210/718 |
| 5,271,849 A * | 12/1993 | Devries | 210/747.9 |
| 6,080,314 A * | 6/2000 | Rose | 210/631 |
| 6,447,682 B1 * | 9/2002 | Flowers | 210/602 |
| 6,531,063 B1 * | 3/2003 | Rose | 210/631 |
| 7,632,408 B1 * | 12/2009 | Everson | 210/605 |
| 2003/0053866 A1 * | 3/2003 | Renaud | 405/129.95 |

* cited by examiner

*Primary Examiner* — Timothy Vanoy
(74) *Attorney, Agent, or Firm* — Suiter Swantz pc llo

(57) ABSTRACT

A system for removing ammonia from landfill leachate comprising an economizer for producing high pressure hot water in a hot water circuit from heat exchange with a hot gas stream carrying waste heat; a boiler which is heated by the high pressure hot water to produce steam; and an ammonia stripper. The ammonia stripper has a leachate inlet connected to a leachate flow path, and an ammonia containing gas outlet. A leachate discharge outlet is connected to a leachate discharge flow path, and a steam inlet is provided which is connected to the boiler by a conduit. At a lower end of the ammonia stripper there is a forced air inlet. A randomly packed bed located between the upper end and the lower end. In use there is a flow of steam and air in one direction and of leachate in the opposite direction which releases ammonia from the leachate.

20 Claims, 3 Drawing Sheets

AMMONIA STRIPPER

The present invention relates to ammonia strippers, in particular the present invention relates to the thermal stripping of ammonia from landfill leachate.

It is well known that leachate from landfill sites contains a quantity of ammonia therein. As part of the leachate cleaning process that is essential to render leachate safe for discharge it is necessary to remove any ammonia therefrom to requisite discharge standards.

There are two known methods of stripping ammonia from liquid, the first is a chemical process that involves increasing the pH of the liquid and the second is purely a thermal method that uses heat only. In large installations the chemical method is almost exclusively used as the energy requirement for the thermal stripping of ammonia is prohibitive and the cost of producing the necessary heat generally makes it economically unviable.

Landfill sites produce methane as organic material therein decomposes. This methane is usually burned in a gas engine or other means for conversion to electrical energy that is then sold. The sale of electricity produced from methane forms a substantial part of the financial viability of managing landfill sites which can be costly to build and manage.

It is the purpose of the present invention to produce an improved thermal leachate treatment system.

According to a first aspect of the invention there is provided a system for removing ammonia from landfill leachate, the system comprising: a landfill gas burner for burning landfill gas to produce a hot exhaust gas stream; an economiser for producing high pressure hot water in a hot water circuit from heat exchange with a hot gas stream carrying waste heat; a boiler, heated by said high pressure hot water for producing steam; an ammonia stripper having: a leachate inlet connected to a leachate flow path, and an ammonia containing gas outlet, at an upper end thereof; a leachate discharge outlet connected to a leachate discharge flow path, a steam inlet connected to the boiler by a conduit, and a forced air inlet, at a lower end thereof; and a randomly packed bed between the upper end and the lower end; wherein, in use, the flow of steam and air in one direction and leachate in the opposite direction, within the ammonia stripper, releases ammonia from the leachate.

The waste heat can be obtained from any suitable waste heat source, such as waste heat from internal combustion engines or gas turbines, waste heat from a blast furnace, or any other source of suitable grade heat.

Preferably the system further comprises a gas burner for burning gas to produce the hot gas stream. Preferably the gas burner burns landfill gas but it will be appreciated that the system may run with any form of combustible gas. This could be syngas from pyrolysis, biogas from an anaerobic digester, or sewage gas from an anaerobic digester, for example.

The system may further comprise a first heat exchanger having an inlet and an outlet for high pressure hot water, and an inlet and an outlet connected in the leachate flow path, wherein heat exchange between the high pressure hot water and the leachate preheats the leachate prior to the ammonia scrubber.

Optionally the system can also comprise: a further heat exchanger having: a leachate inlet and a leachate outlet in the leachate flow path upstream of the ammonia scrubber; and a leachate discharge inlet and a leachate discharge outlet in the leachate discharge flow path; and wherein heat exchange between the leachate discharge and the leachate preheats the leachate prior to the ammonia scrubber. The further heat exchanger is preferably upstream of the first heat exchanger in the leachate flow path.

The system preferably further comprises an ammonia-containing gas flow path connected to the ammonia-containing gas outlet and a condenser disposed within the ammonia-containing gas flow path to condense at least some of the water within ammonia-containing gas passing therethrough. The condenser can have an inlet and an outlet in the ammonia-containing gas flow path and an inlet and an outlet in the leachate flow path such that, in use, heat exchange between the ammonia-containing gas and the leachate condenses water from the ammonia-containing gas and preheats the leachate. The condenser is preferably located in the leachate flow path between the first heat exchanger and the further heat exchanger. Optionally the condenser is further cooled by passage of a cooling fluid through a cooling circuit.

In one arrangement the system further comprises a condensate flow path through which, in use, condensate from the condenser is fed into the upper end of the ammonia scrubber.

A heat exchanger may be provided in the tower end of the ammonia scrubber between the forced air inlet and the steam inlet so that, in use, forced air flows in counter flow over the leachate discharge so as to preheat and saturate the air with water.

In a preferred embodiment the system comprises a control means configured to control the mixture of steam and air entering the packed bed of the ammonia stripper such that the temperature of the air is maintained in the range of 75° C. to 90° C. The control means may also control the flow of fluid through the heat exchangers such that the temperature of the leachate entering the ammonia stripper is maintained in the range of 72° C. to 85° C.

Preferably the ammonia-containing gas is heated in a thermal destructor to decompose the ammonia therein. The thermal destructor may be heated by burning landfill gas. Most preferably the thermal destructor is the landfill gas burner that is used for producing steam.

In one preferred embodiment the thermal destructor comprises: a tower for retaining the heated gasses for a dwell time; a circumferential plenum chamber extending around the tower towards the lower end thereof and having a first ammonia containing gas inlet and at least one ammonia containing gas outlet; a first plurality of landfill gas burners disposed around the circumference of the tower above the at least one outlet; a second plurality of landfill gas burners, substantially centrally located in the tower and disposed vertically below the circumferential plenum chamber; a second ammonia containing gas inlet located at the bottom of the thermal destructor; and a plurality of air inlet louvers disposed in the exterior surface of the tower vertically between the second ammonia containing gas inlet and the second plurality of landfill gas burners.

Although thermal destruction is the preferred method, other means of removing the ammonia from the gas may be used in the invention. These may include catalytic combustion of the ammonia within the ammonia-containing gas and scrubbing of the ammonia out of the ammonia-containing gas using an acid wash. The acid could be sulphuric acid, to produce ammonium sulphate, or phosphoric acid to produce ammonium phosphate or ammonium di-phosphate.

According to a second aspect of the invention there is provided a method for removing ammonia from landfill leachate, the method comprising: passing a hot exhaust gas stream carrying waste heat through an economiser to produce high pressure hot water in a hot water circuit; passing said high pressure hot water through a boiler connected to a source of water to produce an output of steam; providing an ammonia stripper having: an upper end; a lower end; a leachate inlet connected to a leachate flow path, and an ammonia containing gas outlet, at its upper end; a leachate discharge outlet connected to a leachate discharge flow path, a steam inlet connected to the first heat exchanger by a conduit, and a forced air inlet, at the lower end; and a randomly packed bed between the upper end and the lower end; passing a flow of steam and air in one direction through the ammonia stripper and allowing leachate to flow, under the influence of gravity, in the other direction over the packed bed to releases ammonia from the leachate.

Preferably the method includes burning gas, more preferably landfill gas, in a burner to produce said hot gas exhaust stream.

The method preferably includes the step of passing the high pressure hot water and the leachate through separate flow paths in a first heat exchanger so that heat exchange therebetween preheats the leachate prior to the ammonia scrubber. By utilising the waste heat from the boiler to preheat the leachate the efficiency of the system is improved.

The method may include passing the leachate and the leachate discharge through separate flow paths in a further exchanger upstream of the ammonia scrubber so that heat exchange between the discharges leachate and the leachate preheats the leachate prior to the ammonia scrubber. Preferably the leachate passes through the further heat exchanger before passing through the first heat exchanger. As the discharge leachate still has a raised temperature, by passing this through a heat exchanger to recover heat into the incoming leachate flow the amount of waste heat from the boiler required to raise the leachate to the required process temperature is reduced and therefore the amount of landfill gas being burned to product the hot exhaust is reduced.

A preferred method further comprises passing the ammonia containing gas exiting the ammonia scrubber through a condenser to condense at least some of the water within the ammonia containing gas, more preferably passing the leachate through a flow path within the condenser such that heat exchange between the ammonia containing gas and the leachate condenses water from the ammonia containing gas and preheats the leachate. The leachate is preferably passed through the condenser before it passes through the first heat exchanger and after it passes through the further heat exchanger. A further cooling fluid may also be passed through the condenser.

By condensing water from the ammonia-containing gas the amount of water that will pass through the thermal destructor is reduced. As the thermal destructor used energy, preferably from the landfill gas to treat the gas then the higher the water content of the gas the more energy will be required to raise the gas to the required temperature to destroy the ammonia therein. Furthermore too high a water content can cause the burners to become smothered and stop functioning. Condensing the water not only reduces the energy requirement of the thermal destructor but also recovers more heat from the gasses into the incoming leachate. This again reduces the burden on the boiler and therefore reduces the amount of energy needed from the hot exhaust gas.

The method may further comprise feeding condensate from the condenser into the upper end of the ammonia scrubber. The condensate will contain a volume of dissolved ammonia so cannot be discharged. As the volume will be low compared to the volume of leachate this condensate can be fed into the top of the scrubber along with the leachate for treatment. In this way a small amount of water will circulate within the system.

In a preferred method, at the lower end of the ammonia scrubber between the forced air inlet and the steam inlet, the leachate discharge and the forced air are passed in opposing directions through a heat exchange bed to preheat and saturate the air with water. For effective thermal scrubbing of ammonia from leachate it is necessary to pass wet air over the leachate at a temperature above the evaporation point of the ammonia but below the boiling point of the leachate. This requires that the air be heated and that water be added to it. By passing the incoming air in counter flow over the outgoing leachate discharge the incoming air becomes preheated and will pick up some moisture. This reduces the amount of steam required from the boiler, thereby reducing the energy requirement from the exhaust gas as a lower steam production will be required.

The method may include controlling the mixture of steam and air entering the packed bed of the ammonia stripper such that its temperature is maintained in the range of 75° C. to 90° C., preferably the temperature is 80° C.±2° C. The method may further include controlling the flow of fluid through the heat exchangers such that the temperature of the leachate entering the ammonia stripper is maintained in the range of 72° C. to 85° C., preferably the temperature is 75° C.±3° C.

The method may further comprise passing the ammonia containing gas through a thermal destructor to decompose the ammonia therein. Preferably the step of burning landfill gas in a burner to produce a hot gas exhaust stream occurs within the thermal destructor. In this way the waste heat from the thermal destruction of the ammonia is used to drive the system. Due to the multiple-stage heat recovery at each stage that is used to preheat the incoming leachate and the incoming air a system and method with a greatly improved efficiency is provided. Moreover this system is achieved without the need for a raised pH.

According to a third aspect of the invention there is provided a thermal destructor for destroying ammonia in wet ammonia laden gas, the thermal destructor comprising: a tower for retaining heated gasses for a dwell time; a circumferential plenum chamber extending around the tower towards the lower end thereof and having a first ammonia containing gas inlet and at least one plenum outlet; a first plurality of landfill gas burners disposed around the circumference of the tower above the at least one plenum outlet; a second plurality of landfill gas burners, substantially centrally located in the tower and disposed vertically below the at least one plenum outlet; a second ammonia containing gas inlet located at the bottom of the thermal destructor; and a plurality of air inlet louvers disposed in the exterior surface of the tower vertically between the second ammonia containing gas inlet and the second plurality of landfill gas burners.

A specific embodiment of the invention will now be described, by way of example, with reference to the following drawings in which.

Figure 1:
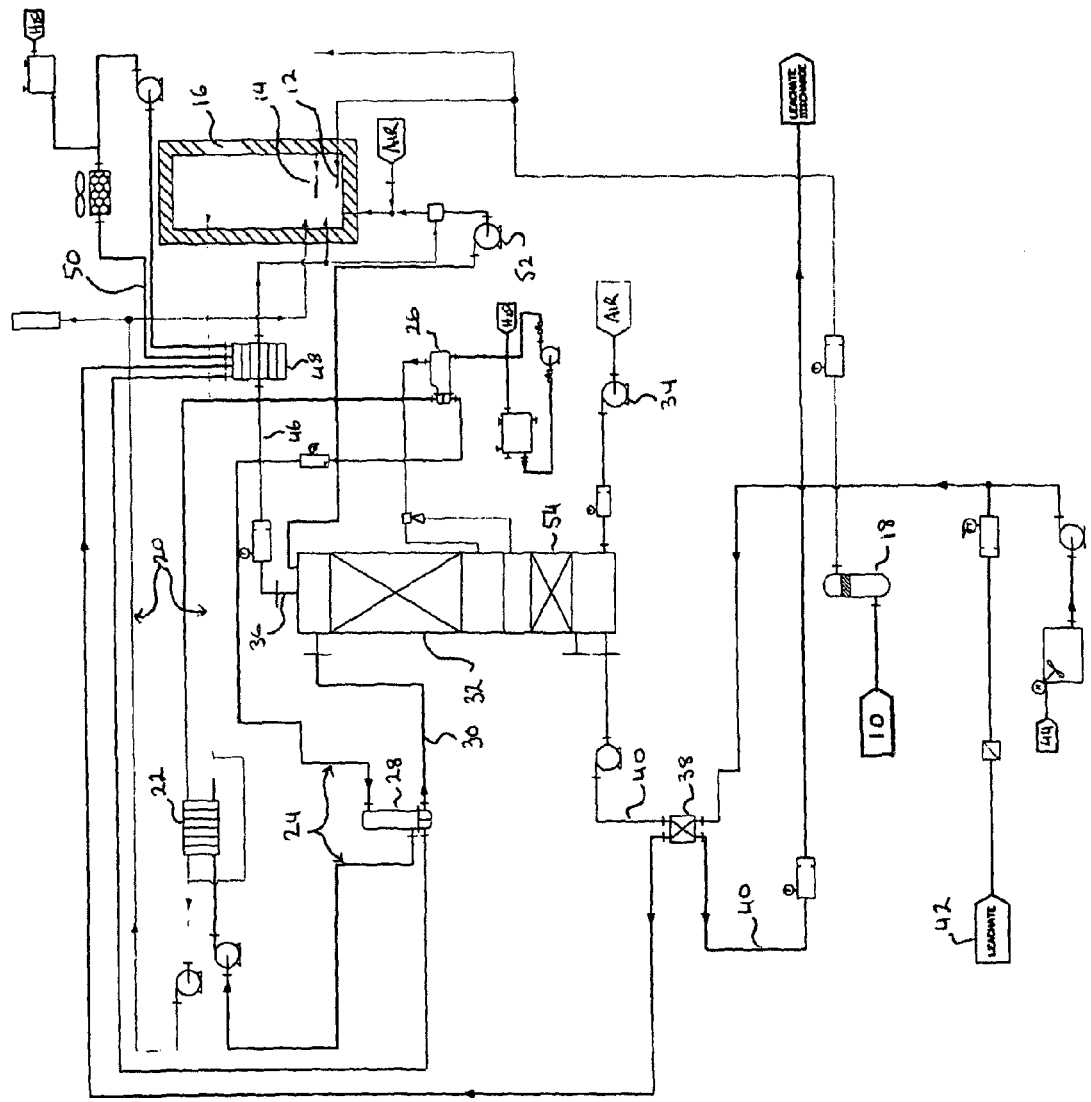
FIG. 1 shows a process flow diagram for the system and method of the present invention.

Referring to FIG. 1 landfill gas 10, comprising substantially of methane is fed into burners 12, 14 located within a thermal destructor 16 via a buffer vessel 18. Hot exhaust gas from the thermal destructor is circulates via a conduit 20 through an economiser 22. High pressure water is circulated through a high pressure water conduit 24 and heat is exchanged between the hot exhaust gases and the water in the economiser 22 to raise the temperature and pressure of the water to approximately 140° C. at 10 bar. The high pressure hot water passes through a boiler 26 in the form of a kettle wherein water is heated by heat exchange with the hot water to create steam. Downstream of the boiler 26 the hot water passes through a first heat exchanger 28. The heat exchanger 28 has a hot water flow path therethrough and a leachate flow path therethrough so that passage of the two fluids causes heat transfer from the hot water to the leachate to raise its temperature.

The leachate exiting the first heat exchanger 28 passes through a conduit 30 into the top of an ammonia stripper 32 that is described in more detail with reference to FIG. 2. Steam from the boiler 28 enters towards the bottom of the stripper 32. Also at the lower end of the stripper 32 is an inlet for a forced air flow created by blower 34. Within the stripper 32 leachate flows in a generally downwards direction under the influence of gravity and the mixture of steam and forced air flow in the opposite direction. The flow of the wet air over the leachate thermally releases ammonia therefrom. The ammonia is carried out of the stripper 32 via en outlet 36 at its upper end. By the time the leachate has passed through the stripper it is substantially free of ammonia and exits towards a lower end thereof as discharge leachate. The temperature of the discharge leachate is above ambient temperature and accordingly carries with it energy from the process. A further heat exchanger 38 is provides in the discharge leachate flow path 40 in which heat is exchanged between incoming leachate 42 and outgoing discharge leachate so as to recover some of the energy from the discharge leachate and preheat the incoming leachate.

An anti foaming agent 44 may be added to the incoming leachate that prevents foaming of the leachate in the system, in particular in the thermal stripper.

Ammonia containing gas exits the stripper 32 via outlet 36 and passes therefrom into a thermal destructor 16 described in more detail in relation to FIG. 3 below. The thermal destructor heats the ammonia containing gas by passing it over burners that are combusting landfill gas, so as to destroy the ammonia therein. As the ammonia containing gas contains a large amount of water a significant amount of energy from the burners 12, 14 is consumed in heating the water.

A condenser 48 is provided in the ammonia containing gas flow path 46 between the stripper 32 and the thermal destructor 16. The condenser 48 is cooled by passing a flow of incoming leachate therethrough. As the incoming leachate is below the condensation point of water, moisture within the ammonia containing gas will condense in the condenser and heat will be transferred from the ammonia containing gas to the incoming leachate, thereby raising its temperature. The condenser 48 is placed in the leachate flow path between the first heat exchanger 28 and the further heat exchanger 38. A further cooling circuit 50 may also pass through the condenser 48 to provide additional cooing if required. Condensate from the condenser is accumulated at a low point of the circuit and is pumped by a pump 52 to the top of the stripper 32 so that it may pass therethrough to release any ammonia that may have become dissolved therein as it condensed.

Located below the stripper is a cooling tower 54 that cools the leachate discharge exiting the stripper 32. The leachate discharge is fed into the top of the cooling tower 54 and the forced air is fed into the bottom of the cooling tower. The forced air and the discharge leachate pass in counter flow over one another so that heat is exchanged between the discharge leachate and the forced air thereby cooling the discharge leachate and pre heating the forced air. The forced air exits the cooling tower and enters the scrubber 32. The forced air may mix with the steam either before it enters the scrubber 32 or within the scrubber.

A controller (omitted for clarity) controls the flow of air and steam to obtain a temperature of approximately 80° C. for the incoming saturated heated air. The controller also controls the amount of landfill gas being burned and the fluid flow through the heat exchangers, in particular through the first heat exchanger 28 to obtain a leachate temperature of approximately 75° C. at the point of entry of the leachate into the scrubber 32. In this way the temperature of the leachate passing through the scrubber 32 can be maintained at a temperature at which thermal release of ammonia from leachate is effective.

Figure 2:
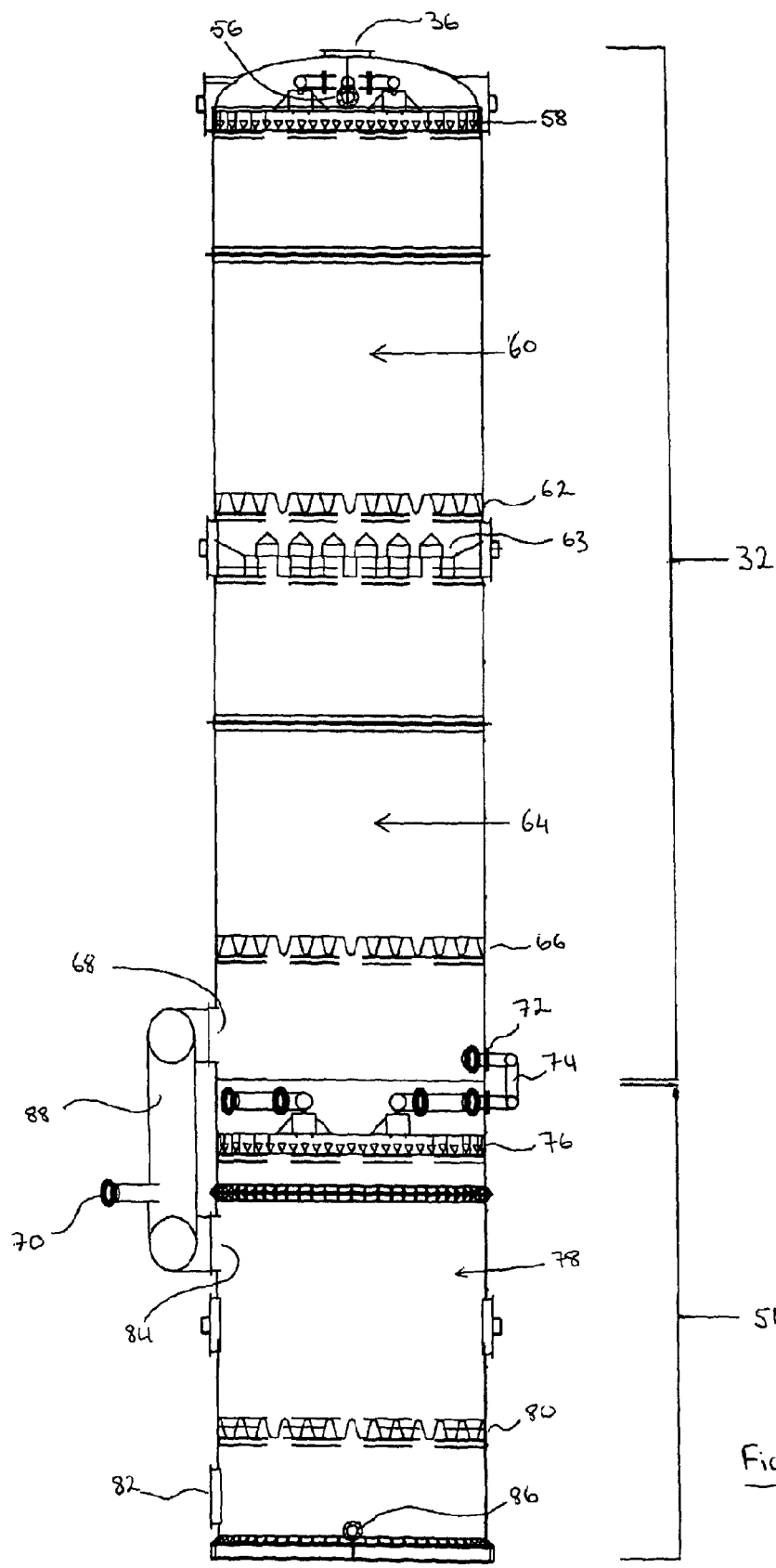
FIG. 2 shows a schematic of an ammonia stripper of the present invention.

Referring now to FIG. 2 combined ammonia stripper 32 and cooling tower 54 is shown. The stripper 32 has an inlet 56 at its upper end at which leachate is introduced into the stripper 32. The leachate flows through a liquid distributor 58 so that it is distributed evenly over the upper surface of a first packed bed 60 which is supported on a first packing support 62. The packed bed 60 may comprise any suitable packing material, for example pall rings.

Below the first packing support 62 is a liquid re-distributor 63 that redistributes the leachate evenly over the upper surface of a second packed bed 64 supported on a second packing support 66.

An inlet 68 for ambient air and steam is provided below the second packing support 66. The steam mixes with the air to saturate it and to raise its temperature. In use the steam and air pass upwardly through the packed beds 64, 60 as the leachate passes in the opposite direction under the influence of gravity. The packed beds 64, 60 ensure a large surface area of leachate is exposed to the saturated hot air. The ammonia is released from the leachate in the stripper 32 and passes out of an ammonia containing gas outlet 36 at the top of the stripper 32. At the bottom of the stripper 32 is an outlet 72 for the treated leachate.

Situated immediately below the stripper 32 is a cooling tower 54 in which the treated leachate (discharge leachate) is cooled. A conduit 74 transfers the treated leachate from the outlet 72 to a fluid distributer 76 from where it passes over a further packed bed 78 supported on a further packing support 80, under the influence of gravity.

Below the further packing support 80 is an ambient air inlet 82 through which forced air enters the cooling tower. The forced air and the discharge leachate pass in counter flow over the packed bed and the forced air exits the cooling tower at an outlet 84 at its upper end. Counter flow of the discharge leachate and the forced air cools the discharge leachate and raises the temperature of the air so that it is already preheated before it mixes with the steam.

A discharge outlet 86 is located at the bottom of the cooling tower 54 through which discharge leachate exits the combined cooling tower/stripper assembly.

A conduit 86 transfers the preheated ambient air form the cooling tower 54 to the ammonia stripper 32. The conduit 88 has a steam inlet 70 through which steam is injected into the air flow passing therethrough to saturate it and further heat it.

Although shown as a combined unit it will be appreciated by the skilled person that it would be possible to separate the stripper 32 and the cooling tower 54 into two separate components which could be placed adjacent one another as opposed to on top of one another.

Figure 3:
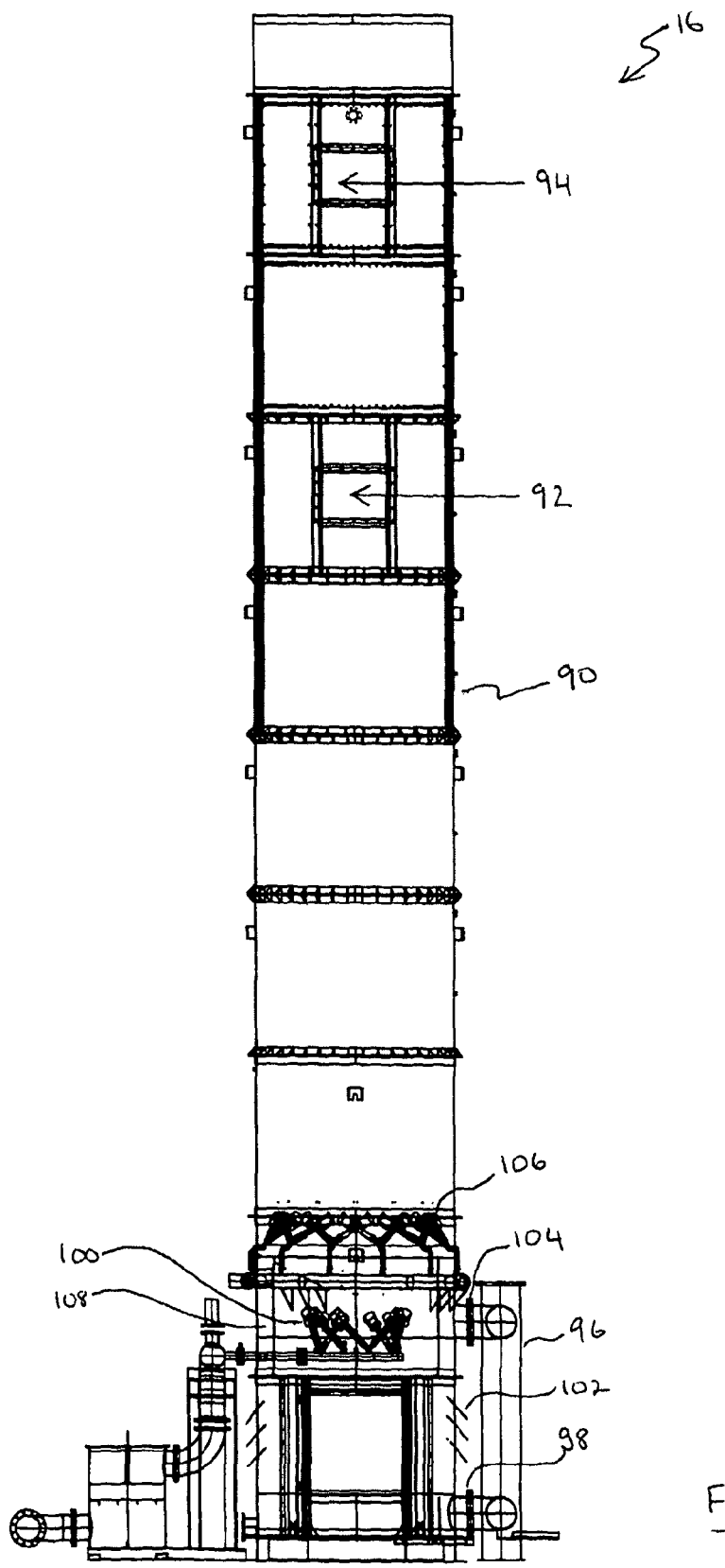
FIG. 3 shows a schematic of a thermal destructor of the present invention.

Referring now to FIG. 3 a thermal destructor 16 for use in the invention is shown. The thermal destructor comprises a combustion area towards its lower end and a large chimney like structure 90 extending vertically therefrom. The chimney like structure is capped at an upper end and has a vent (not shown) through which gasses therein can be vented, however it will be appreciated that the chimney like structure could also open to vent at its upper end.

The chimney like structure 90 has a exhaust gas outlet 92 and an return exhaust gas inlet 94. Hot exhaust gas taken from the outlet and returned to the inlet passes through the energiser to drive heat fluid in the high pressure hot water circuit.

Referring now to the combustion area this is split into a primary combustion are and a secondary combustion area. An ammonia containing gas manifold 96 feeds ammonia containing gas to a primary inlet 98 faceted at the bottom of the combustion zone. A baffle plate may be provided above the inlet 98 and have a central outlet therethrough so that ammonia containing gas is fed substantially up the centre of the primary combustion area. A plurality of primary combustion burners 100 are fed via a manifold with landfill gas. The landfill gas is burned in the burners and the ammonia containing gas passes thereover as it rises through the primary combustion area. A plurality of louvers 102 allow air to be drawn into the thermal destructor to pass with the ammonia containing gas through the primary burners 100.

The ammonia containing gas manifold 96 also feeds ammonia containing gas to a second inlet 104 from where it enters a circumferential plenum chamber 108 inside the thermal destructor 16. The plenum chamber 108 has at least one outlet around its upper edge through which the ammonia containing gas can exit the plenum chamber into the second combustion area. Situated circumferentially around the interior of the thermal destructor 16 at a position above the plenum chamber 108 outlet is a second plurality of burners 106. In use ammonia containing gas passing out of the plenum chamber 108 is directed over the second plurality of burners 106 so that it becomes heated.

The invention claimed is:

1. A system for removing ammonia from landfill leachate, the system comprising:
    an economiser for producing high pressure hot water in a hot water circuit from heat exchange with a hot gas stream carrying waste heat;
    a boiler, heated by said high pressure hot water for producing steam;
    an ammonia stripper having: a leachate inlet connected to a leachate flow path, and an ammonia containing gas outlet, at an upper end thereof; a leachate discharge outlet connected to a leachate discharge flow path, a steam inlet connected to the boiler by a conduit, and a forced air inlet, at a lower end thereof; and a randomly packed bed between the upper end and the lower end;
    wherein, in use, the flow of steam and air in one direction and leachate in the opposite direction, within the ammonia stripper, releases ammonia from the leachate.

2. The system of claim 1 further comprising a gas burner for burning gas to produce the hot gas stream.

3. The system according to claim 1 further comprising:
    a first heat exchanger having an inlet and an outlet for high pressure hot water, and an inlet and an outlet connected in the leachate flow path, wherein heat exchange between the high pressure hot water and the leachate preheats the leachate prior to the ammonia scrubber.

4. The system according to claim 1 further comprising:
    a further heat exchanger having: a leachate inlet and a leachate outlet in the leachate flow path upstream of the ammonia scrubber; and a leachate discharge inlet and a leachate discharge outlet in the leachate discharge flow path; and wherein heat exchange between the leachate discharge and the leachate preheats the leachate prior to the ammonia scrubber.

5. The system according to claim 4 wherein the further heat exchanger is upstream of the first heat exchanger in the leachate flow path.

6. The system according to claim 1 further comprising:
    an ammonia containing gas flow path connected to the ammonia containing gas outlet and a condenser disposed within the ammonia containing gas flow path to condense at least some of the water within ammonia containing gas passing therethrough.

7. The system according to claim 6 wherein the condenser has an inlet and an outlet in the ammonia containing gas flow path and an inlet and an outlet in the leachate flow path such that, in use, heat exchange between the ammonia containing gas and the leachate condenses water from the ammonia containing gas and preheats the leachate.

8. The system according to claim 6 wherein the condenser is located in the leachate flow path between the first heat exchanger and the further heat exchanger.

9. The system according to claim 6 wherein the condenser is cooled by passage of a cooling fluid through a cooling circuit.

10. The system according to claim 6 further comprising a condensate flow path through which, in use, condensate from the condenser is fed into the upper end of the ammonia scrubber.

11. The system according to claim 1 further comprising a heat exchanger in the lower end of the ammonia scrubber between the forced air inlet and the steam inlet wherein, in use, forced air flows in counter flow over the leachate discharge so as to preheat and saturate the air with water.

12. The system according to claim 1 further comprising a control means configured to control the mixture of steam and air entering the packed bed of the ammonia stripper such that the temperature of the air is maintained in the range of 75° C. to 90° C.

13. The system according to claim 12 wherein the control means is configured to control the flow of fluid through the heat exchangers such that the temperature of the leachate entering the ammonia stripper is maintained in the range of 72° C. to 85° C.

14. The system according to claim 13 wherein the thermal destructor comprises:
    a tower for retaining the heated gasses for a dwell time;
    a circumferential plenum chamber extending around the tower towards the lower end thereof and having a first ammonia containing gas inlet and at least one ammonia containing gas outlet;
    a first plurality of landfill gas burners disposed around the circumference of the tower above the at least one outlet;
    a second plurality of landfill gas burners, substantially centrally located in the tower and disposed vertically below the circumferential plenum chamber;
    a second ammonia containing gas inlet located at the bottom of the thermal destructor; and
    a plurality of air inlet louvers disposed in the exterior surface of the tower vertically between the second ammonia containing gas inlet and the second plurality of landfill gas burners.

15. The system according to claim 1 wherein the ammonia containing gas is heated in a thermal destructor to decompose the ammonia therein.

16. The system according to claim 15 wherein the thermal destructor is heated by burning landfill gas.

17. A method for removing ammonia from landfill leachate, the method comprising:
- passing a hot gas stream carrying waste heat from a heat source through an economiser to produce high pressure hot water in a hot water circuit;
- passing said high pressure hot water through a boiler connected to a source of water to produce an output of steam;
- providing an ammonia stripper having: an upper end; a lower end; a leachate inlet connected to a leachate flow path, and an ammonia containing gas outlet, at its upper end; a leachate discharge outlet connected to a leachate discharge flow path, a steam inlet connected to the first heat exchanger by a conduit, and a forced air inlet, at the lower end; and a randomly packed bed between the upper end and the lower end;
- passing a flow of steam and air in one direction through the ammonia stripper and allowing leachate to flow, under the influence of gravity, in the other direction over the packed bed to releases ammonia from the leachate.

18. The method according to claim 17 further comprising:
- passing the ammonia containing gas exiting the ammonia scrubber through a condenser to condense at least some of the water within the ammonia containing gas.

19. The method according to claim 18 further comprising:
- passing the leachate through a flow path within the condenser such that heat exchange between the ammonia containing gas and the leachate condenses water from the ammonia containing gas and preheats the leachate.

20. A system for removing ammonia from landfill leachate, the system comprising:
- an economiser for producing high pressure hot water in a hot water circuit from heat exchange with a hot gas stream carrying waste heat;
- a boiler, heated by said high pressure hot water for producing steam;
- an ammonia stripper having: a leachate inlet connected to a leachate flow path, and an ammonia containing gas outlet, at an upper end thereof; a leachate discharge outlet connected to a leachate discharge flow path, a steam inlet connected to the boiler by a conduit, and a forced air inlet, at a lower end thereof; and a randomly packed bed between the upper end and the lower end;
- an ammonia containing gas flow path connected to the ammonia containing gas outlet and a condenser disposed within the ammonia containing gas flow path to condense at least some of the water within ammonia containing gas passing therethrough; and
- wherein the condenser has an inlet and an outlet in the ammonia containing gas flow path and an inlet and an outlet in the leachate flow path such that, in use, heat exchange between the ammonia containing gas and the leachate condenses water from the ammonia containing gas and preheats the leachate.

* * * * *